United States Patent [19]

Neu

[11] 4,217,317
[45] Aug. 12, 1980

[54] COOLING TOWER WITH VERTICAL-AXIS FAN

[75] Inventor: Francis Neu, Lille, France

[73] Assignee: S.A. Delta Neu, Lille, France

[21] Appl. No.: 927,939

[22] Filed: Jul. 25, 1978

[30] Foreign Application Priority Data

Mar. 13, 1978 [FR] France .............................. 78 08417

[51] Int. Cl.² .............................................. B01F 3/04
[52] U.S. Cl. ............................ 261/160; 165/DIG. 1;
    261/109; 261/110; 261/DIG. 11; 261/DIG. 77
[58] Field of Search ................. 261/30, 109, 110, 152,
    261/155, DIG. 11, DIG. 77, 158–161;
    165/DIG. 1

[56] References Cited
U.S. PATENT DOCUMENTS

| 2,157,070 | 5/1939 | Coey | 261/DIG. 11 |
| 2,311,155 | 2/1943 | Carr | 261/30 |
| 2,872,168 | 2/1959 | Mart | 261/30 |
| 2,890,870 | 6/1959 | Spiselman | 261/30 |
| 3,865,911 | 2/1975 | Lefevre | 261/DIG. 11 |
| 3,923,935 | 12/1975 | Cates | 261/DIG. 77 |
| 3,944,636 | 3/1976 | Schuldenberg et al. | 261/DIG. 77 |
| 4,076,771 | 2/1978 | Houx, Jr. et al. | 261/DIG. 11 |

Primary Examiner—Richard L. Chiesa
Attorney, Agent, or Firm—Fleit & Jacobson

[57] ABSTRACT

A cooling tower comprising at its lower portion, beneath an exchange surface, a catch basin receiving the cooled water and having an aperture formed therein, a vertical-axis fan mounted in the aperture being adapted to draw air from beneath the basin and force it upwards through the tower, a conventional water streaming mechanism being provided at the upper portion of the tower.

3 Claims, 9 Drawing Figures

FIG_4

COOLING TOWER WITH VERTICAL-AXIS FAN

The present invention relates to wet-type cooling towers wherein the heat exchange between water and air is promoted by causing the water to stream on an exchange surface.

The disadvantages of cooling towers of this type, when the rotating mass of the ventilation means necessary for transferring the amount of air required for producing the heat exchange is disposed in the upper portion of the tower, i.e. downstream of the wet exchanger, are well known in the art:

- toilsome and difficult assembling requiring special handling equipments and gangways for giving access thereto;
- undesired vibrations likely to jeopardize the strength of the cooling tower framework;
- difficulties for the maintenance staff who must use ladders and handling equipments;
- subjecting the ventilation system to severe operating conditions since the air flowing at this location is heated and close to saturation, and still contains droplets in suspension. This is detrimental to the fan, the fan motor and the electric connections.

Other disadvantages are due to the loss of floor space when the fan is located downstream of the exhanger, for in this case considerable room must be freed about the tower for permitting the free passage of cooling air.

The same remarks apply when the fan is disposed upstream of the heat exchanger, on the side thereof, where it occupies a considerable space.

It is the primary object of the present invention to improve cooling towers by providing a more adequate relative arrangement of its component elements.

According to this invention, the cooling tower comprises at its base, overlying a heat exchange surface, a catch basin adapted to receive the cooled water and provided with an aperture, a vertical-axis fan located in said aperture for drawing air from beneath the basin in order to blow this air upwardly into the tower, the latter being equipped in the known fashion, in its upper section, with a water trickling or streaming device.

This and other features of the present invention will be better understood from the following description of typical forms of embodiment of the invention, shown by way of illustration, not of limitation, in the accompanying drawing, in which.

Figure 1:
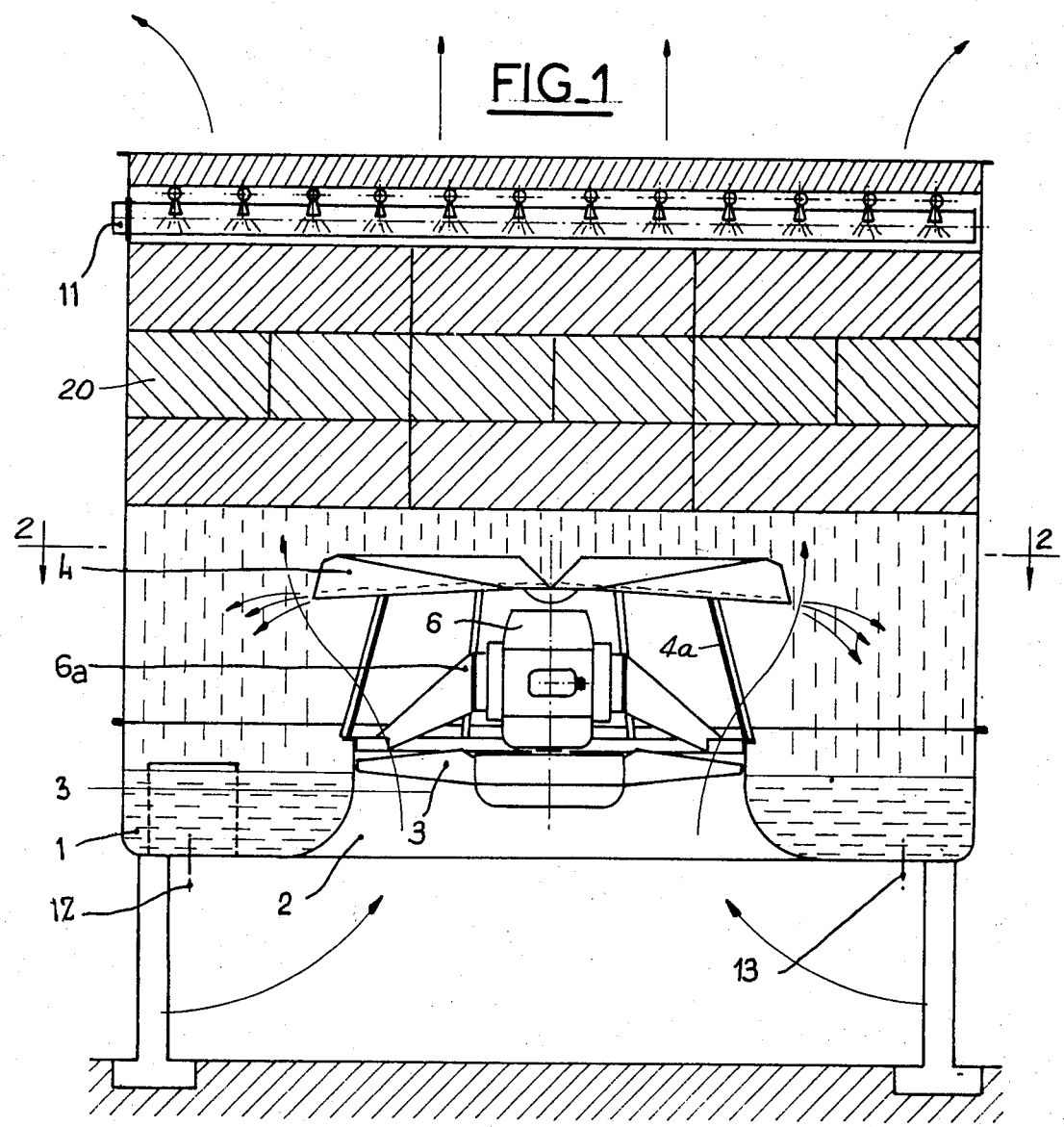
FIG. 1 is a vertical axial section of a cooling tower constructed according to the teachings of this invention.
Figure 2:
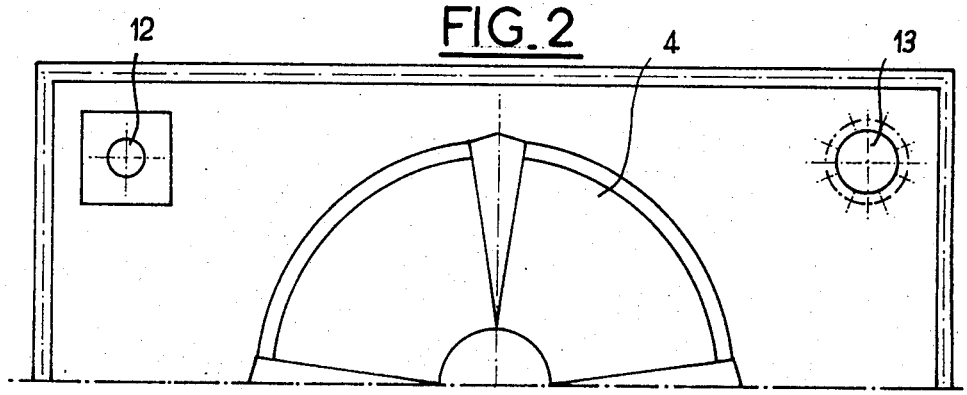
FIG. 2 is a half plane view from above, taken in the direction of the line 2—2 of FIG. 1.

FIGS. 1 and 2 show in vertical section and in plane view, respectively, a typical embodiment and relative arrangement of the component elements of a cooling tower constructed according to the teachings of the present invention. The catch basin 1 receives water from a distributor 11 located in the upper portion after its passage through a wet exchanger 20 in which air is caused to flow in counter-current relationship.

The basin 1 is located in the lower portion of the apparatus and so constructed that it comprises at least one aperture 2 leading to the outside of the tower and in the lower and central portion thereof. Mounted in this aperture 2 is at least one fan 3 associated with means for protecting same from the streaming water.

Figure 3:
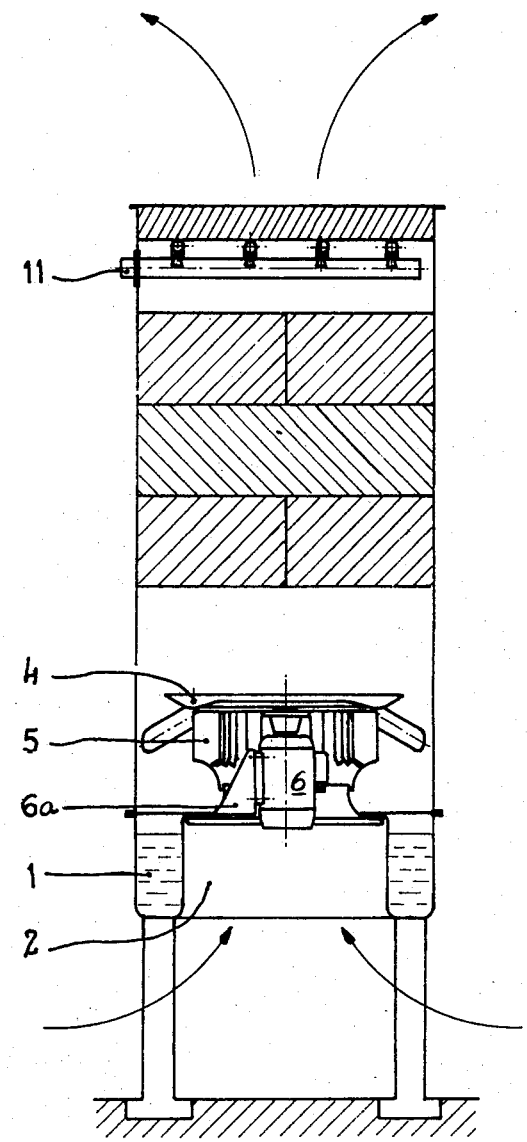
FIG. 3 is a vertical axial section of a tower equipped with a different fan type.

These means comprise a canopy or cap 4 collecting water in its central portion and discharging it via eaves formed in the sheet-metal covering of this canopy supported by props 4a carried by a ledge of said vessel. In the form of embodiment illustrated in FIG. 3, the fan comprises a centrifugal rotor or wheel 5 having its blades inclined to the rear. This fan is driven by a motor 6 supported by stayrods 6a.

Of course, the fan may also comprise a rotor of the intermediate propeller-centrifugal type.

The following essential advantageous features are derived from this specific tower construction:

- the revolving component elements are located in the lower portion of the tower, thus ensuring a substantial reduction in vibration;
- the volume of water surrounding the fan assists in efficiency damping out vibration;
- the positions of the fan and of the transmission means necessary for driving it facilitate greatly the access thereto;
- the fan, the fan motor and the transmission system therebetween are located outside the hot and humid air circuit, in an area free of water droplets in suspension;
- the access is greatly facilitated for maintenance operations and electrical connections.

By virtue of this adequate arrangement of the component elements, the best use is made of the usually lost floor space, even when several cells must be assembled.

The fan position removes any risk of developing frost in winter operation, in contrast to what is observed when the fan is disposed on one side of the heat exchanger.

Due to this particular conception of cooling towers, heat exchangers of relatively large dimensions that are nevertheless easily transportable through conventional means can be constructed and utilized.

A typical advantage deriving from this cooling tower construction is the possibility of accepting light-weight structure elements to avoid frameworks that are sometimes complicated, while affording the use of corrosion-resistant materials.

Figure 4:
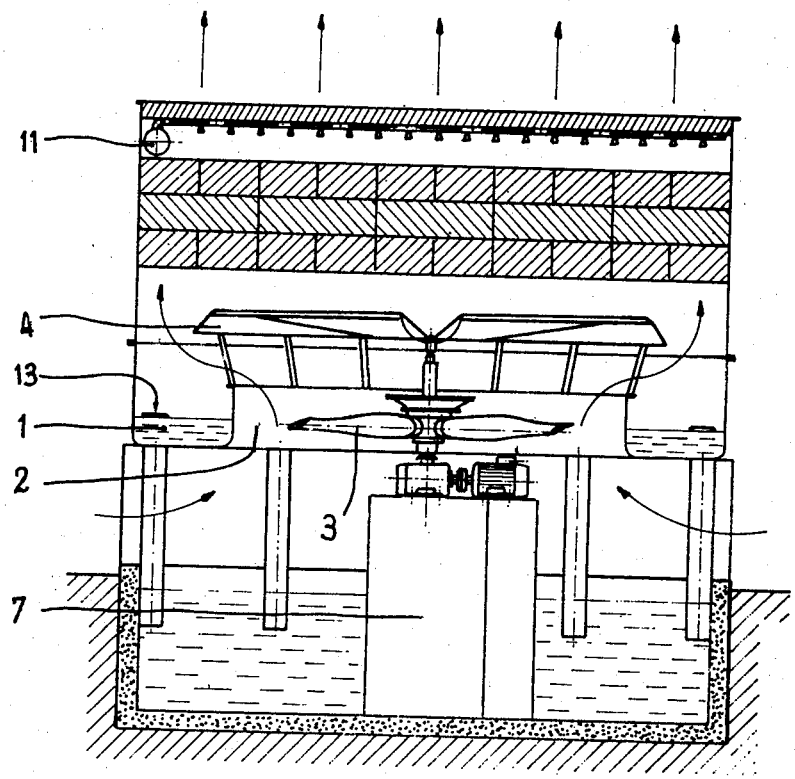
FIG. 4 is a vertical axial section of a tower provided with a central fan support.

A typical form of embodiment of the cooling tower according to the present invention is illustrated in FIG. 4. A chief advantage deriving from this construction lies in the fact that heavy loads and dynamic stresses are transferred to a support 7 somewhat independent of the cooling tower structure, thus eliminating any transmission of mechanical vibration. In an assembly of this type, it is contemplated according to the invention to use a rotor of the axial-flow helical turbine type as illustrated in FIG. 4, although centrifugal or helico-centrifugal turbine types may also be used.

Figure 5:
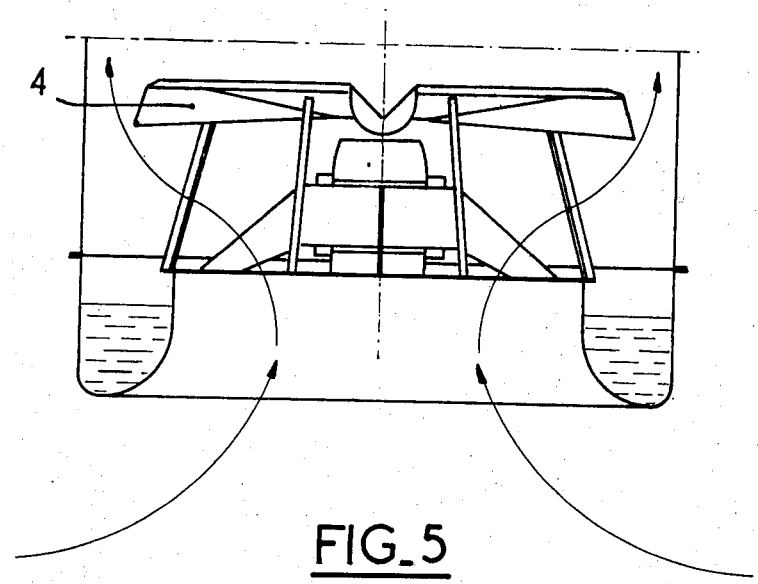
FIG. 5 is a fragmentary side elevational view of a modified form of embodiment of the invention.
Figure 6:
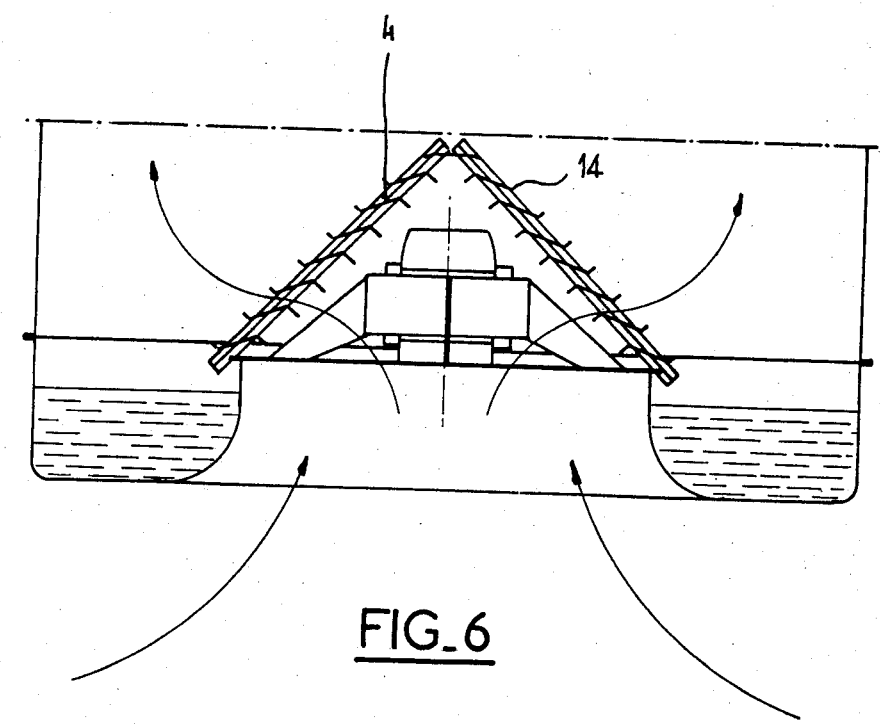
FIG. 6 is a section showing another modified form of embodiment.

FIG. 5 shows one of the canopy-like devices that can be erected over the fan for receiving the cooled water and rejecting it by means of eaves at well-defined locations in the form of jets to prevent the formation of a nearly continuous screen or sheet of water likely to interfere with the free air flow. It is another object of this invention to permit the use of a device of the type illustrated in FIG. 6, consisting of inclined baffles 14 permitting the passage of air through the water sheet formed in the tower while increasing the heat exchange between air and water.

Figure 7:
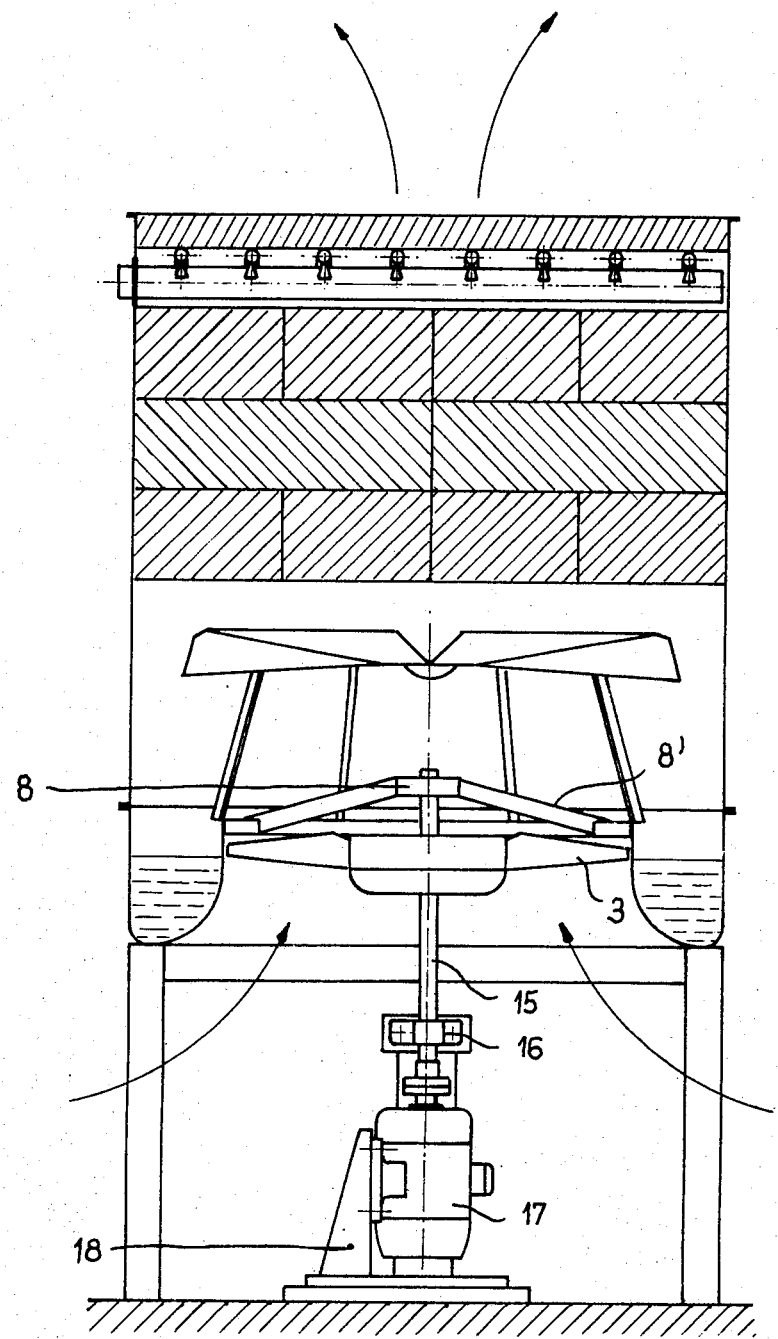
FIG. 7 is a sectional view of a cooling tower in which the fan wheel is mounted by means of swivel joint means to the end of a driving shaft.

FIG. 7 illustrates the means contemplated for automatically centering the fan rotor 3. The latter, by using a self-aligning rolling-contact bearing shown diagrammatically at 8 and supported by props 8', permits adjusting the centering of the rotor mounted on a shaft 15 and held at the opposite end by a bearing 16. The motor 17 is coupled to this shaft 15 and mounted on a frame 18 permitting the proper positioning of this motor.

The cooling tower operation may be improved in winter time while keeping in mind either an additional saving of water or the necessity of meeting environment requirements by suppressing the wreath of steam issuing from the top of the tower.

Figure 8:
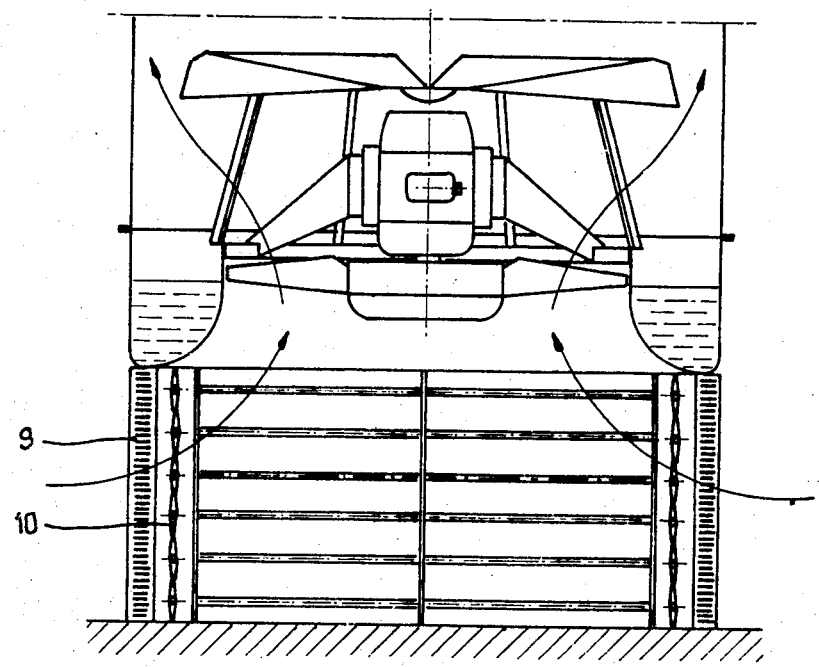
FIG. 8 is a sectional view of a cooling tower provided with a dry exchanger at its bottom.

FIG. 8 illustrates a possible solution to these problems. Two of the four suction faces of the tower are equipped with a dry exchanger 9 and adjustable shutters or louvers 10. The other two faces are provided only with adjustable louvers or like slated shutters. In summer, water flows only through the wet exchanger located above the fan, and the louvers or shutters are wide open. In winter, one may cause the water to flow either through the dry exchanger alone, or firstly through this dry exchanger and then through the wet exchanger. If water is caused to flow only through the dry exchanger, both the wreath of steam and the water consumption are suppressed. If water is caused to flow firstly through the dry exchanger and then through the wet exchanger, both the wreath of steam and the water consumption are reduced.

Figure 9:
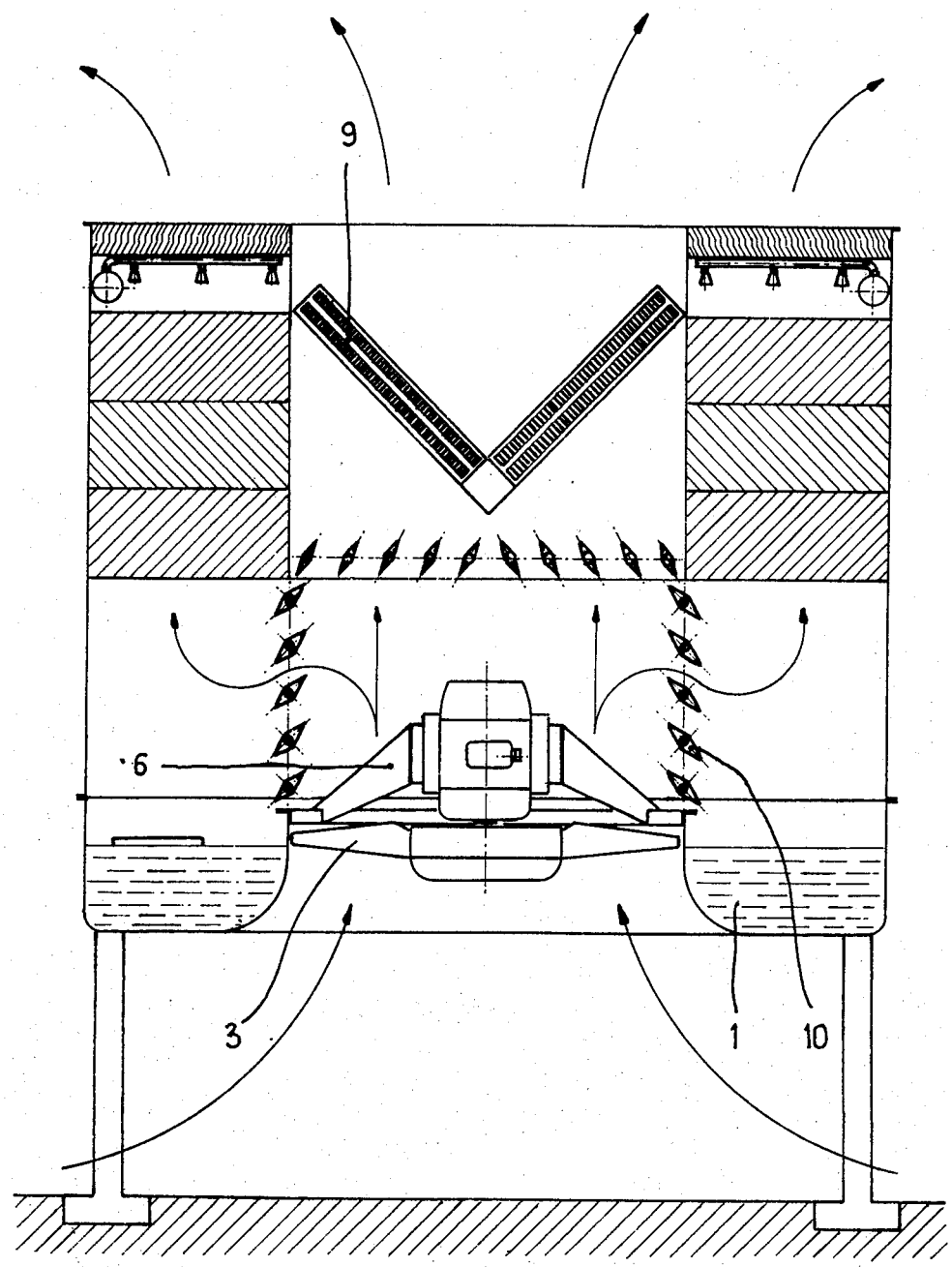
FIG. 9 is a sectional view of a cooling tower provided at its upper end with a dry exchanger and a wet exchanger in combination.

Similarly, the arrangement illustrated in FIG. 9, which constitutes another modified embodiment of this invention, is particularly interesting for it takes the best advantage of the vertical-axis fan mounting on the upstream side, especially if a helicoid-type fan is used. It consists in causing the wet exchange to take place in the outer peripheral portion of the tower and to install in the central vertical portion thereof a dry exchanger 9 operating in series or in parallel with the wet exchanger, according to weather conditions, in order to increase the exchange and reduce the wreath of steam. In addition, this invention also contemplates the use of movable shutters or louvers 10 affording a wide range of combinations of the various conditions of operation of the cooling tower.

Although specific forms of embodiment of the invention have been shown and described herein, it will readily occur to those skilled in the art that various modifications and changes may be brought thereto without departing from the scope of the invention as set forth in the appended claims.

What is claimed as new is:

1. A cooling tower comprising a heat-exchanging water-streaming device and a catch basin for collecting the cooled water, and located at the lower portion of the tower, said basin comprising at least one central aperture in which is mounted a fan assembly comprising a vertical-axis fan adapted to draw air from underneath the catch basin, and overhead means adapted to receive the cooled water and to distribute it to said basin via special channels formed in said means so as to discharge the cooled water in restricted areas thereby avoiding formation of water sheets, and driving means comprising a fan motor for actuating the fan with its rotor, and transmission means therebetween which comprises a fan shaft and a self-aligning bearing in which said fan shaft is rotatably mounted, for constantly centering the fan rotor in a sleeve surrounding said rotor, said driving means being mounted on supporting means rigidly supported by said catch basin, a surface-type dry heat exchanger being disposed under said catch basin on the suction side of said fan, together with power-driven louvers permitting the cold-weather operation of the tower by causing the water to selectively stream through one of the following paths:
   through the cooling tower alone,
   through the dry exchanger in order to eliminate a wreath of steam released by conventional cooling towers,
   through said dry exchanger and then through the cooling tower.

2. A cooling tower as claimed in claim 1, wherein provision is made for protection means comprising inclined shutter blades for preventing streaming water from contacting said fan assembly while permitting the passage of air through the water sheets formed by said blades to continue exchange of heat between the air and water streams.

3. A cooling tower as claimed in claim 1, wherein said fan assembly and said driving means are positioned above the level of water in the catch basin.

* * * * *